US010932621B2

(12) United States Patent
Quider (10) Patent No.: US 10,932,621 B2
(45) Date of Patent: Mar. 2, 2021

(54) COOKING APPARATUS HAVING WOODEN SIDE MEMBERS

(71) Applicant: WILD EARTH WINES LIMITED, Central Otago (NZ)

(72) Inventor: Quintin Quider, Central Otago (NZ)

(73) Assignee: WILD EARTH WINES LIMITED, Central Otago (NZ)

( * ) Notice: Subject to any disclaimer, the term of this patent is extended or adjusted under 35 U.S.C. 154(b) by 0 days.

(21) Appl. No.: 14/888,540

(22) PCT Filed: May 2, 2014

(86) PCT No.: PCT/IB2014/061151
§ 371 (c)(1),
(2) Date: Nov. 2, 2015

(87) PCT Pub. No.: WO2014/178025
PCT Pub. Date: Nov. 6, 2014

(65) Prior Publication Data
US 2016/0066745 A1    Mar. 10, 2016

(30) Foreign Application Priority Data
May 2, 2013    (NZ) .................................... 610141

(51) Int. Cl.
*A47J 37/07* (2006.01)

(52) U.S. Cl.
CPC ....... *A47J 37/0727* (2013.01); *A47J 37/0713* (2013.01); *A47J 37/0763* (2013.01)

(58) Field of Classification Search
CPC . A47J 37/0727; A47J 37/0713; A47J 37/0763

USPC .......................................................... 99/444
See application file for complete search history.

(56) References Cited

U.S. PATENT DOCUMENTS

| 4,043,312 A | 8/1977 | Kern |
| 4,180,050 A | 12/1979 | Sizemore |
| 4,535,749 A * | 8/1985 | Schlosser ............ A47J 37/0763 |
| | | 126/25 R |

(Continued)

FOREIGN PATENT DOCUMENTS

EP    1 595 482 A2    11/2005

OTHER PUBLICATIONS

Canadian Bacon and Alanneila and Tom C, Wiskey Barrel UDS, Jun. 13, 2009-Jun. 15, 2010, internet, The Smoke Ring, pp. 1-13, 1-9,1-5,1-4.*

(Continued)

*Primary Examiner* — Christopher M Koehler
*Assistant Examiner* — Spencer H. Kirkwood
(74) *Attorney, Agent, or Firm* — Buchanan Ingersoll & Rooney PC (57) ABSTRACT

A cooking apparatus having a base member and a plurality of side members held together to form a container, a heating means inside the container for generating heat in the container, the container having an opening for placing food to be cooked in the container, and is capable of storing liquid, wherein the heating means is a gas burner and is positioned above a maximum liquid level, and further including a first shield member inside the container, spaced from a side wall of the container and surrounding the burner to restrict flame from the gas burner from contacting the side wall.

38 Claims, 12 Drawing Sheets

(56) References Cited

U.S. PATENT DOCUMENTS

| | | | | |
|---|---|---|---|---|
| 4,582,041 | A | * | 4/1986 | Erickson ............ A47J 37/0704 126/25 R |
| 4,909,137 | A | * | 3/1990 | Brugnoli ............ A47J 37/0682 126/41 R |
| 4,979,436 | A | * | 12/1990 | McGowan ............ A23B 4/052 126/25 R |
| 5,117,747 | A | * | 6/1992 | Kuechler ............ A47J 37/0682 126/41 R |
| 5,320,028 | A | * | 6/1994 | Grunberg ............ A47J 36/18 126/369 |
| 5,553,601 | A | * | 9/1996 | Parker ............ A47J 37/0713 126/38 |
| 6,053,354 | A | * | 4/2000 | Niemeyer ............ B65F 1/1473 220/819 |
| 6,213,002 | B1 | | 4/2001 | Batten et al. |
| 2004/0255926 | A1 | * | 12/2004 | Waits ............ A23B 4/044 126/25 R |
| 2005/0051151 | A1 | * | 3/2005 | Johnson ............ A47J 37/0713 126/41 R |
| 2007/0221191 | A1 | | 9/2007 | O'Brien et al. |
| 2007/0261691 | A1 | * | 11/2007 | Choi ............ A47J 37/0786 126/25 R |
| 2008/0078374 | A1 | * | 4/2008 | Polkinghorn ............ A47J 36/12 126/194 |
| 2008/0271613 | A1 | | 11/2008 | Lee |
| 2009/0078127 | A1 | * | 3/2009 | McLemore ............ A23B 4/052 99/482 |
| 2010/0175682 | A1 | * | 7/2010 | Erikson ............ A47J 37/067 126/25 R |
| 2010/0269713 | A1 | | 10/2010 | Foster |

OTHER PUBLICATIONS

Canadian Bacon and Alanneila and Tom C, Wiskey Barrel UDS, Jun. 13, 2009-Jun. 15, 2010, internet, The Smoke Ring, pp. 1-13, 1-9,1-5,1-4. (Year: 2009).*

International Search Report (PCT/ISA/210) dated Sep. 4, 2014, by the Singapore Patent Office as the International Searching Authority for International Application No. PCT/IB2014/061151.

First Examination Report dated May 6, 2013 issued in the corresponding New Zealand Patent Application 610141 (3 pages).

Examination Report under section 18(3) dated Nov. 24, 2015 issued in the corresponding Great Britain Patent Application No. 1519116.6 (2 pages).

You Tube Video http://www.youtube.com/watch?v=9_K8nl6Jchw uploaded Oct. 16, 2009.

Alan Arthur, "Alan Arthur's bucket barrel smoker project" [online] (retrieved from the internet on Aug. 21, 2014) <URL http://s951. photobucket.com/user/midwestcreditcare/library/barrel%20smoker% 20project>, Jul. 14, 2010 (Jul. 14, 2010), p. 1-4.

Canadian Bacon, "Whiskey Barrel UDS" [online] (retrieved from the internet on Aug. 21, 2014) <URL http://thesmokering.com/forum/viewtopic.php?t=29275>, Jul. 15, 2010 (Jul. 15, 2010), p. 1-4.

International Preliminary Report on Patentability (PCT/IB/373) dated Nov. 3, 2015, by the Swiss Patent Office as the International Bureau for International Application No. PCT/IB2014/061151.

* cited by examiner

COOKING APPARATUS HAVING WOODEN SIDE MEMBERS

FIELD OF THE INVENTION

The present invention relates to a cooking apparatus and, particularly, but not exclusively, to a cooking apparatus for barbecuing.

BACKGROUND TO THE INVENTION

A barbecue grill is, typically, a cooking device including a metal container having a grill above a heat source for cooking food by placing on the grill. Barbecue grills can be gas fuelled, charcoal fuelled or electrically heated and are extremely popular methods of cooking, especially in warm climates.

Most gas fuelled barbeque grills reach high temperatures by forcing the gas to burn quickly using high air-gas flow. These barbeque grills are ineffective in capturing smoke. Therefore, foods cooked on such barbecue grills tend to become dry, if cooked for an extended period of time.

SUMMARY OF THE INVENTION

With the aforementioned in mind, an aspect of the present invention provides a cooking apparatus including a base member and a plurality of side members held together to form a container, a heating means inside the container for generating heat in the container, the container having an opening for placing place food to be cooked in the container, wherein the container is capable of storing liquid.

The heating means is a gas burner and is positioned above a maximum liquid level. Preferably, the gas burner is an inline burner.

In an embodiment, the base member and the plurality of side members are constructed from wood. It is understood that in this embodiment there may be other, non-wooden, materials associated with and/or formed into the base member and/or side members.

As well as advantageously assisting with the cooking of food, in the embodiment having a wooden base and wooden side members, the storing of liquid (such as water) advantageously maintains hydration of the side members. Preferably, the configuration of the side members and the base is such that liquid can be retained without additional components. However, it is anticipated that in particular situations and embodiments, it may be desirable to provide additional means for storing liquid, such as a tray. For example, when the side walls and base are made from wood, it may be that after extended periods of non-use, the container is no longer watertight due to drying of the wood. Provision of a tray or another component suitable for holding liquid allows for the continued operation of the cooking apparatus in such situations, and may enable the container to naturally return to a watertight state.

The apparatus includes a first shield member inside the container, spaced from a side wall of the container and surrounding the burner to restrict flame from the gas burner from contacting the side wall. The shape of the first shield member may complement shape of the side wall. At least one leg may attach the first shield member to the container.

The apparatus may further include a second shield member below the burner to restrict flame from the gas burner from directly contacting the base member.

The apparatus may further include a third shield member above the heating means to restrict debris from falling on the heating means. Furthermore, the third shield member is a receptacle having at least one aperture such that solid debris of a size are gathered in the receptacle, and liquid debris exit the receptacle. The third shield member may be used for charcoal grilling or smoking.

The apparatus may be provided with a scoop having an elongate handle for delivering smoke chips to the receptacle through an aperture on a side of the container above the receptacle.

The apparatus may include a housing outside the container for securely mounting gas parts, and the gas parts may be mounted on a side of the housing adjacent the container to protect the gas parts during transport.

The apparatus may include a hook mounted on a side of the container to hang a gas regulator attached to a flexible gas pipe connected to the burner.

The apparatus may include a rack assembly having at least two legs mountable in the container and at least one cooking platform locatable on the at least two legs. Preferably, each leg includes a rest to receive a respective protrusion attached to the at least one cooking platform. Further preferably, each leg is received in a slot in a frame attached to the container, wherein the frame is the first shield member. The at least two legs may be mounted to a frame or the first shield member. The rack assembly may provide four cooking levels.

Preferably, at least one cooking platform includes a side edge to restrict food from falling off.

The rack assembly may be removed from the container by relaxing a pre-tensioned biasing means.

A thermostatic control valve may control the temperature inside the container.

The apparatus may include at least one first aperture on the side of the container, the first aperture located below the heating means to feed air to the heating means. In addition, a maximum liquid level is provided by the at least one first aperture such that excessive liquid filled in the container is drained from the at least one first aperture. Moreover, the apparatus could be provided with a plurality of such first apertures spaced from each other.

The apparatus may include a plurality of second apertures on the side of the container, the second apertures located above the heating means to vent heat and smoke from the container. Preferably, the plurality of second apertures are spaced from each other. Further preferably, the second apertures are tapered from the outside of the container towards the inside of the container.

The apparatus may include a lid member to cover the opening of the container.

Preferably, the lid member has a vent aperture to vent heat and smoke from the cooking apparatus. Additionally, the apparatus may include an openable vent cover to selectively open and close or partially open the vent aperture. Preferably, the openable vent cover is a plate rotatably attached to the lid member.

The lid member may include a plurality of wooden members held together, and at least one strut member securely attached to the plurality of wooden members by fasteners.

A handle may be attached to the lid member, the handle external to the cooking apparatus, to assist opening the container, wherein the handle includes a wooden holding member. Preferably, the handle is located oppositely to a hinge member, the hinge member pivots the lid member relative to the container.

The apparatus may include a hinge member, the hinge member pivotably attaches the lid member to the container such that the lid member can be moved between a closed position in which the lid member covers the opening, and an open position in which the lid member is moved away from the opening.

Preferably, the hinge member includes a first element attached to the lid member, a second element attached to the container and a bar connecting the first and second elements such that first element rotates relative to the second element at the bar. The bar may be used as a handle to move the cooking apparatus.

Additionally, the hinge member may include a biasing means to assist opening and closing the container. The biasing means relaxes when moving the lid member towards the open position such that the lid member is pulled by the biasing means towards the open position. Whereas, the biasing means tenses when moving the lid member towards the closed position in order to prevent the free falling of the lid member on the opening of the container.

The hinge member may include a stopping means to restrict movement of the lid member at a predetermined open position.

A plurality of fasteners may attach a holding member to the plurality of side members in order to secure the side members. Preferably, at least one fastener attaches the holding member to each side member.

A plurality of wheels may be attached at bottom of the container to assist moving the cooking apparatus. Preferably, a first wheel is attached at a first end, the first end corresponds to location of a hinge member attaching the container to a lid member, and a second wheel is attached at a second end, the second end opposite the first end. One of the first and second wheels may be a rotatable castor wheel and the other may be a fixed castor wheel.

BRIEF DESCRIPTION OF THE DRAWINGS

The invention will now be described in more detail, by way of example only, with reference to the accompanying drawings in which.

DESCRIPTION OF PREFERRED EMBODIMENT

Cooking Apparatus

In general, a cooking apparatus is disclosed which is capable of being constructed from a wooden container. The cooking apparatus is preferably made from a wine barrel.

Referring to the FIGS. 1 to 7, a cooking apparatus 50 includes a base member 52 and a plurality of wooden side members 54 held together to form a container 56. A plurality of fasteners 136 attaches a holding member 138 to the each of side members 54 in order to secure the side members 54. The arrangement prevents the side members 54 from unfastening even if they slightly shrink in size because of the heat in the container 56.

The container 56 has an opening 60 to place food in the container 56. In this preferred example, the container 56 is a wooden barrel used for wine making. A wine barrel is generally considered to be aesthetically pleasing and unusual as a cooking apparatus. However, the cooking apparatus can be constructed from any suitable shaped container. For example, a metal barrel could be used but it has been found than a wooden barrel provides a number of distinct advantages. Particularly, a wooden barrel provides low thermal conductivity, allowing safer operation. In addition, a wooden barrel that has been previously used for other purposes, such as for wine making, or other alcoholic beverages, can provide added cooking benefits it terms of imparting aromas to the food itself.

A heating means 58 inside the container 56 is provided to generate heat in the container 56. The heating means 58 in this embodiment is an inline gas burner. It is also possible that an electric heater or a wood/coal fire, or other heating source, could also be the heating means.

The gas burner 58 is located above a maximum liquid level. The maximum liquid level is at the bottom of a first aperture 106 on the side wall 64 of the container 56. Any excessive liquid entering the container 56 is drained from the first aperture 106. Additionally, the first aperture 106 feeds fresh air/oxygen to the burner 58. In this embodiment, the container 56 has four first apertures 106 spaced from each other. Each first aperture 106 is circular having diameter 50 mm. Each first aperture 106 is located 150 mm from the bottom of the container 56.

The container 56 is able to store liquid to hydrate the wooden side members 54. It has been found that if the container 56 is not filled with a hydrating liquid, such as water, when being used with a wooden barrel, the wooden side members 54 tend to become dry and shrink in size. If the wooden members 54 shrink, the container 56 is no longer able to hold the liquid. It is envisioned that a separate receptacle, preferably made of metal, may be provided for storing the liquid in the container 58.

When liquid is stored at the bottom of the container 56, the liquid receives waste matter from cooking such as food debris, fat and oil. Thereby, the likelihood of waste matter adhering to the bottom of the container 56 is reduced significantly. The container 56 is tilted to drain the liquid and any debris caught in the liquid from the first aperture 106. The waste matter thereby disposed off easily when disposing the water from the container 56.

The preferred level of liquid stored in a wine barrel container 56 is about 7 cm to 12 cm at the bottom of the container 56. The liquid stored, in use, is tap water.

It has also been surprisingly found that the liquid also assists in cooking of food by providing steam and, therefore, steaming the food. Providing additional cooking benefits to the food itself.

Shields

Figure 1:
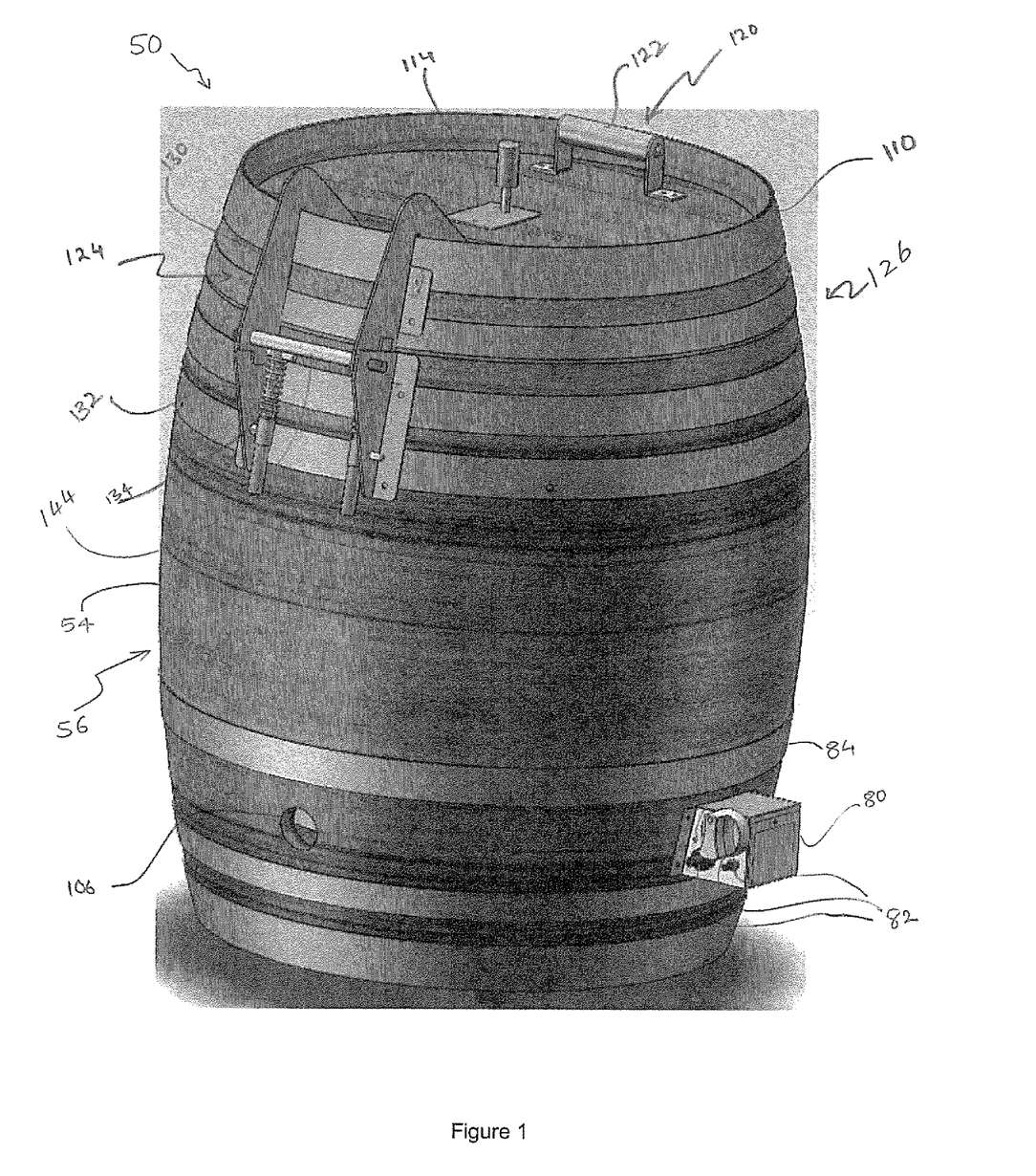
FIG. 1 shows a three dimensional view of a cooking apparatus according to an embodiment of the present invention in a closed position.
Figure 2:
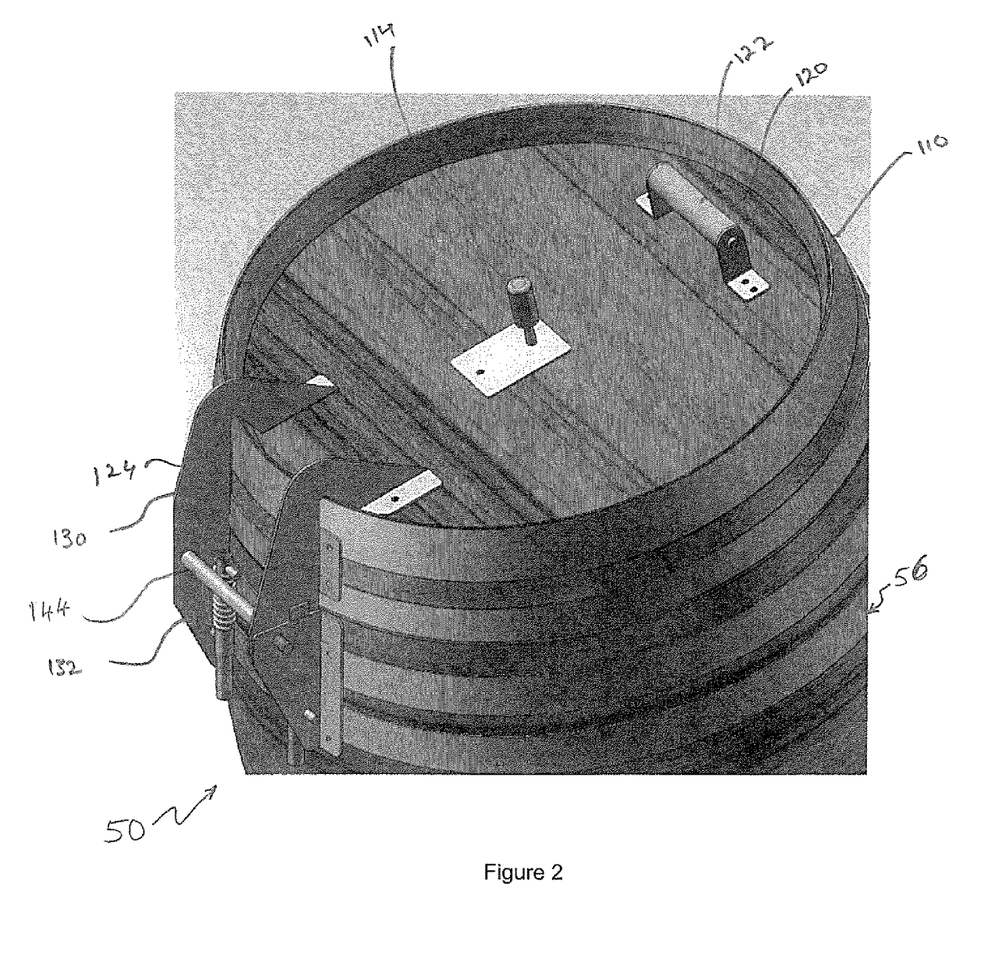
FIG. 2 shows a three dimensional view of a top portion of the cooking apparatus of FIG. 1.
Figure 3:
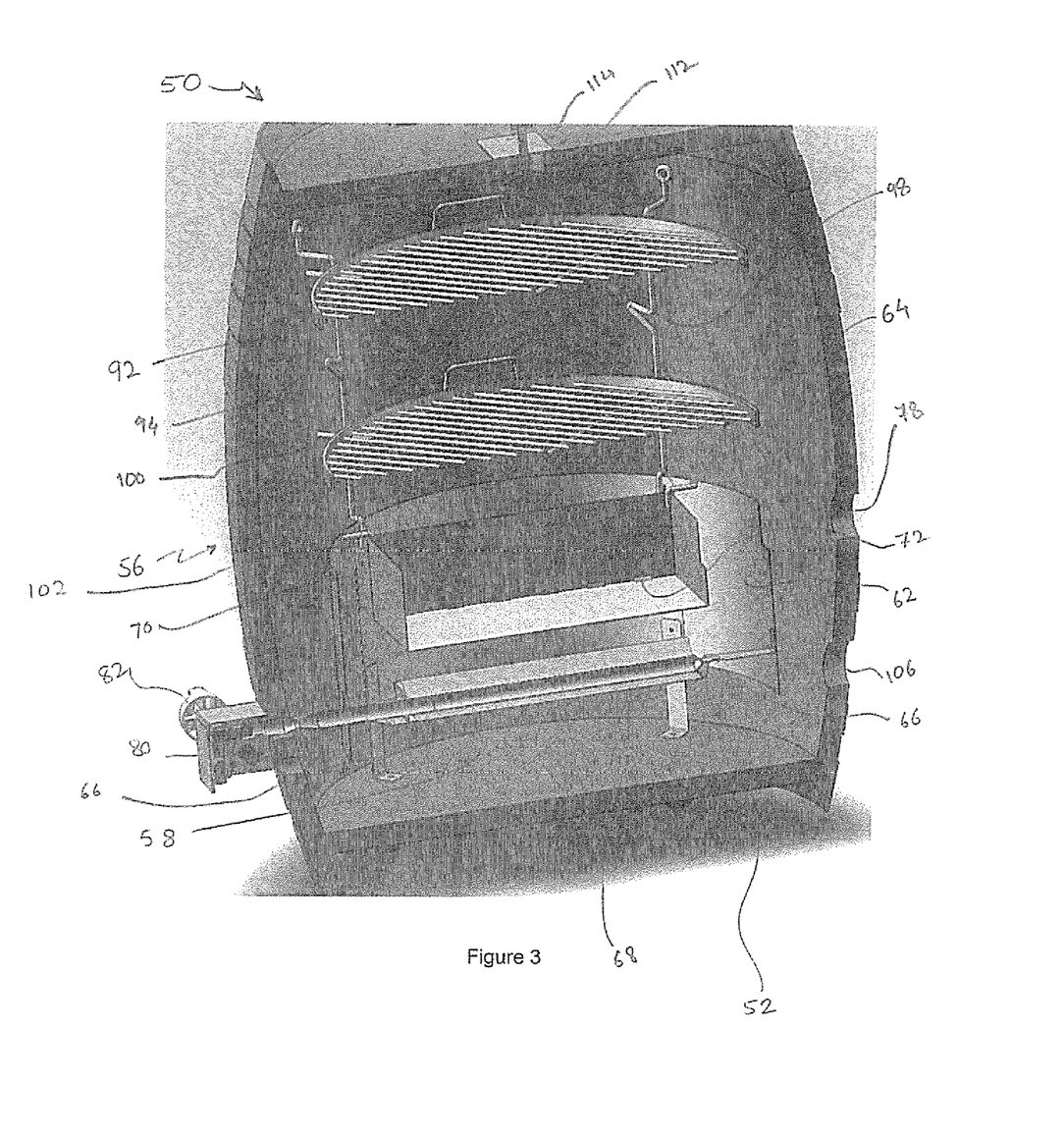
FIG. 3 shows a sectional view of the cooking apparatus of FIG. 1.
Figure 4:
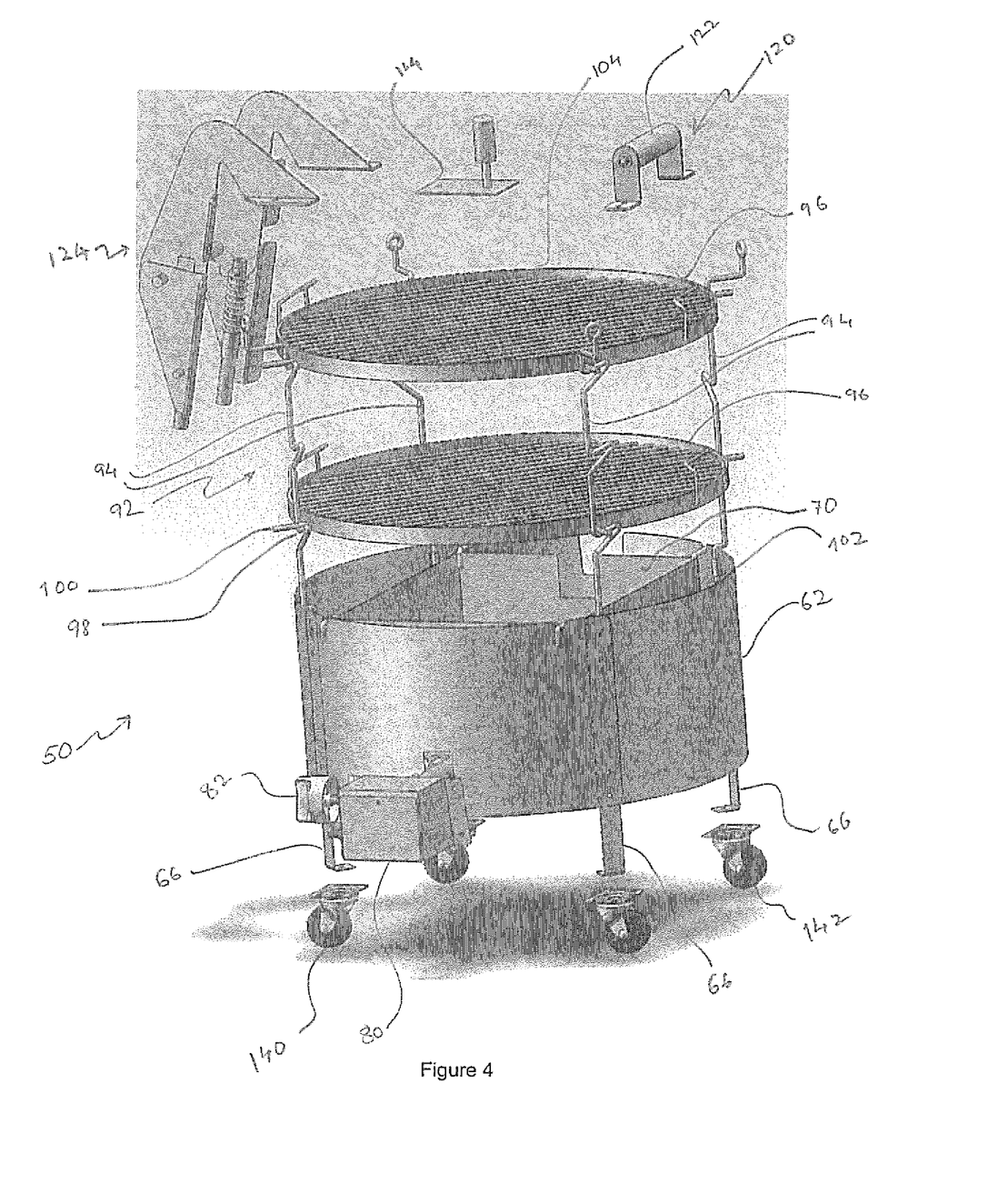
FIG. 4 shows a three dimensional view of the cooking apparatus of FIG. 1, the view excludes the container.
Figure 5:
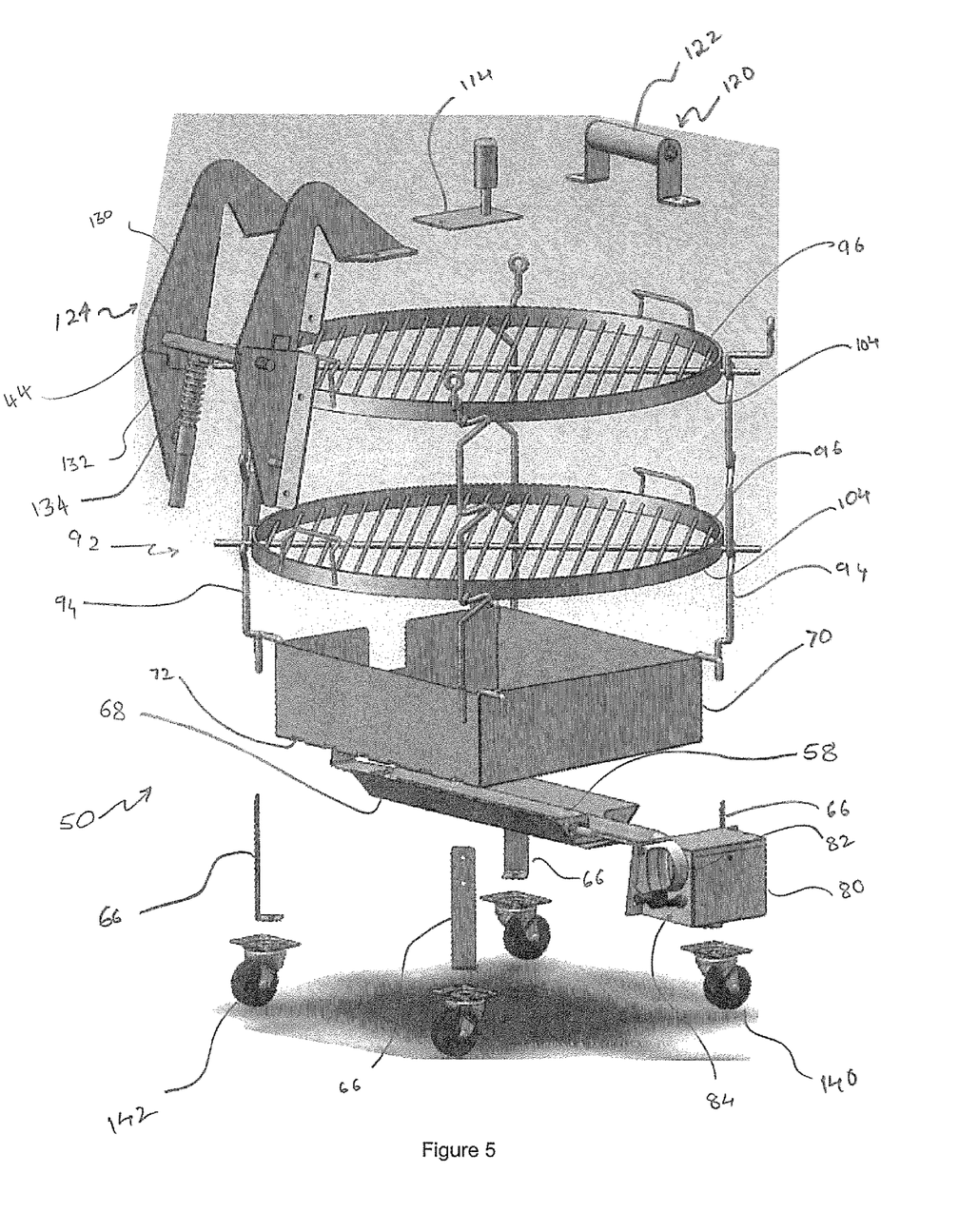
FIG. 5 shows a three dimensional view of the cooking apparatus of FIG. 1, the view excludes the container and the first shield member.

Referring particularly to FIGS. 4 and 5, a first shield member 62 is positioned inside the container 56. The first shield member 62 is spaced from the side wall 64 of the container 56, and it surrounds the gas burner 58. The first shield member 62 is cylindrical to substantially complement the inside shape of the container 56. The first shield member 62 is made of four metal sheets riveted to each other to form a cylindrical shield.

The first shield member 62 protects a portion of the side wall 64 from direct flame emitted by the gas burner 58 in use. Additionally, the first shield member 62 protects the burner flame from wind entering through, for example, the first aperture 106. The prototype cooking apparatus has been successfully tested in an environment with wind speeds up to 40 knots (nautical miles an hour) or approximately 74 kilometres per hour.

Four legs 66 attached the first shield member 62 to the base member 52. A fastener, such as a rivet, attaches a leg 66 to the two metal sheets of the first shield member 62, such that the three components are joined together by a single fastener. This arrangement allows the liquid placed at bottom of the container 56 to be in direct contact with the side members 54. Also, the spacing between the first shield member 62 and the container 56 assists in draining liquid and any debris in the liquid from the container.

A second shield member 68 is located below the gas burner 58. The second shield member 68 restricts flame and heat from being directed towards the base member 52 and, additionally, can redirect heat, that would otherwise be lost, towards the grill (cooking platform 96, described below). Although, in use, the container 56 will be filled with the liquid at its bottom, which, by its self, restricts flame and heat being directed towards the base member 52, the second shield member 68 also restricts the flame and heat from reaching any flammable debris, such as fat dropped in the the liquid. The second shield member 68 is a receptacle to pour smoking wood chips directly on flame to smoke the foods being cooked.

A third shield member 70 is located above the heating means 58 to restrict debris such as fat, oils, food particles from falling on the heating means 58. The third shield member 70 is a receptacle to catch and filter debris. The receptacle 70 gathers solid debris of a certain size, thereby preventing this debris from falling in the liquid. The receptacle 70 has apertures 72 at its lower end to release liquid debris such as cooking oils, molten fat, etc. in the liquid to the bottom of the container 56.

Figure 10A:
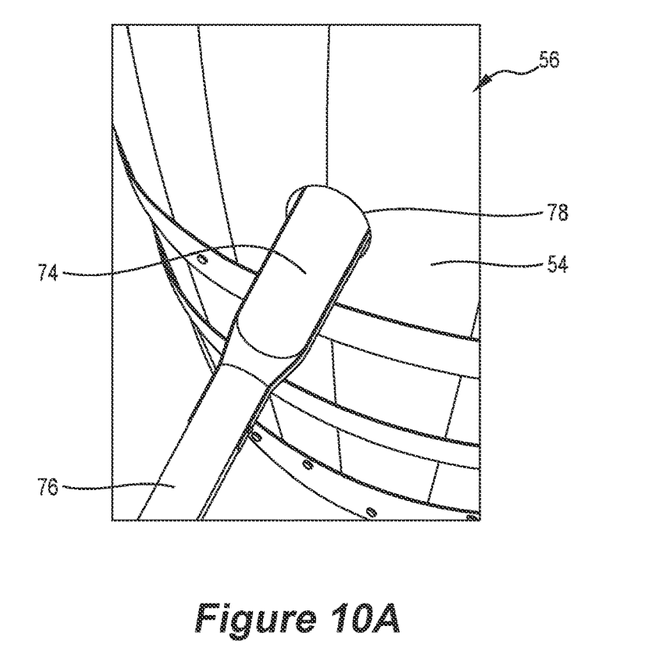
FIGS. 10A and 10B show a scoop for delivering charcoal chips to a shield member in the container.
Figure 10B:
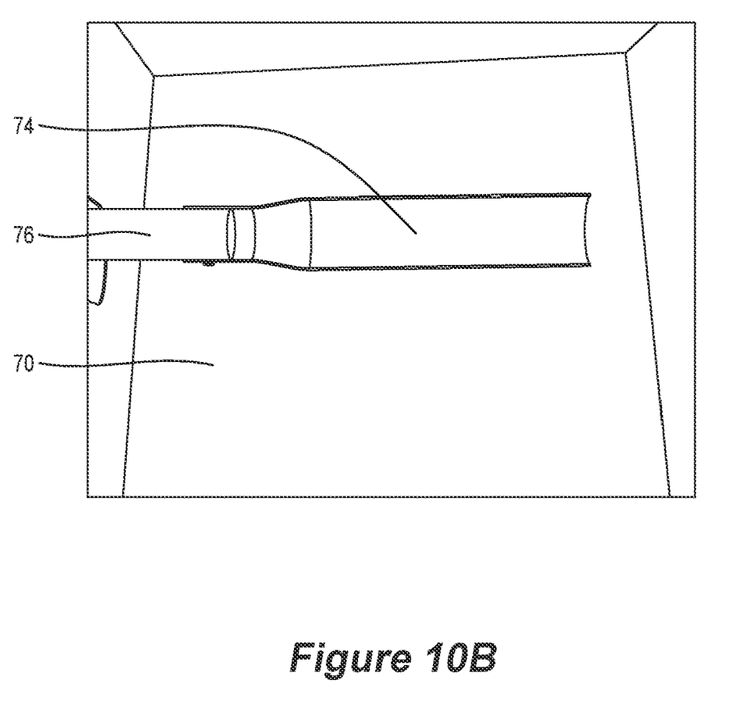

The receptacle 70 has an added advantage that it can be used to place wood chips for smoking food. The wood chips are activated by the heat from the heating means 58 located below, at an appropriate temperature, allowing any food on the grill to be smoked. A scoop 74 having an elongate handle 76 is provided for delivering smoking wood chips to the receptacle 70. The scoop 74 enters the container through an aperture 78 on the side wall 64 of the container 56, the aperture 78 located above the receptacle 70.

In this embodiment, the aperture 78 is circular, and the scoop 74 and its handle 76 are cylindrical. The scoop 74 holding wood chips is inserted in the container 56 and rotated to drop wood chips in the receptacle 70. The design optimises the amount of wood chips that can be poured in the receptacle 70.

The three shield members 62, 68, 70 cover the burner 58 from the top, bottom and side, to protect burner flame from wind, debris and the liquid.

The shield members 62, 68, 70 are made of metal, preferably stainless steel.

Gas Parts

Figure 9:
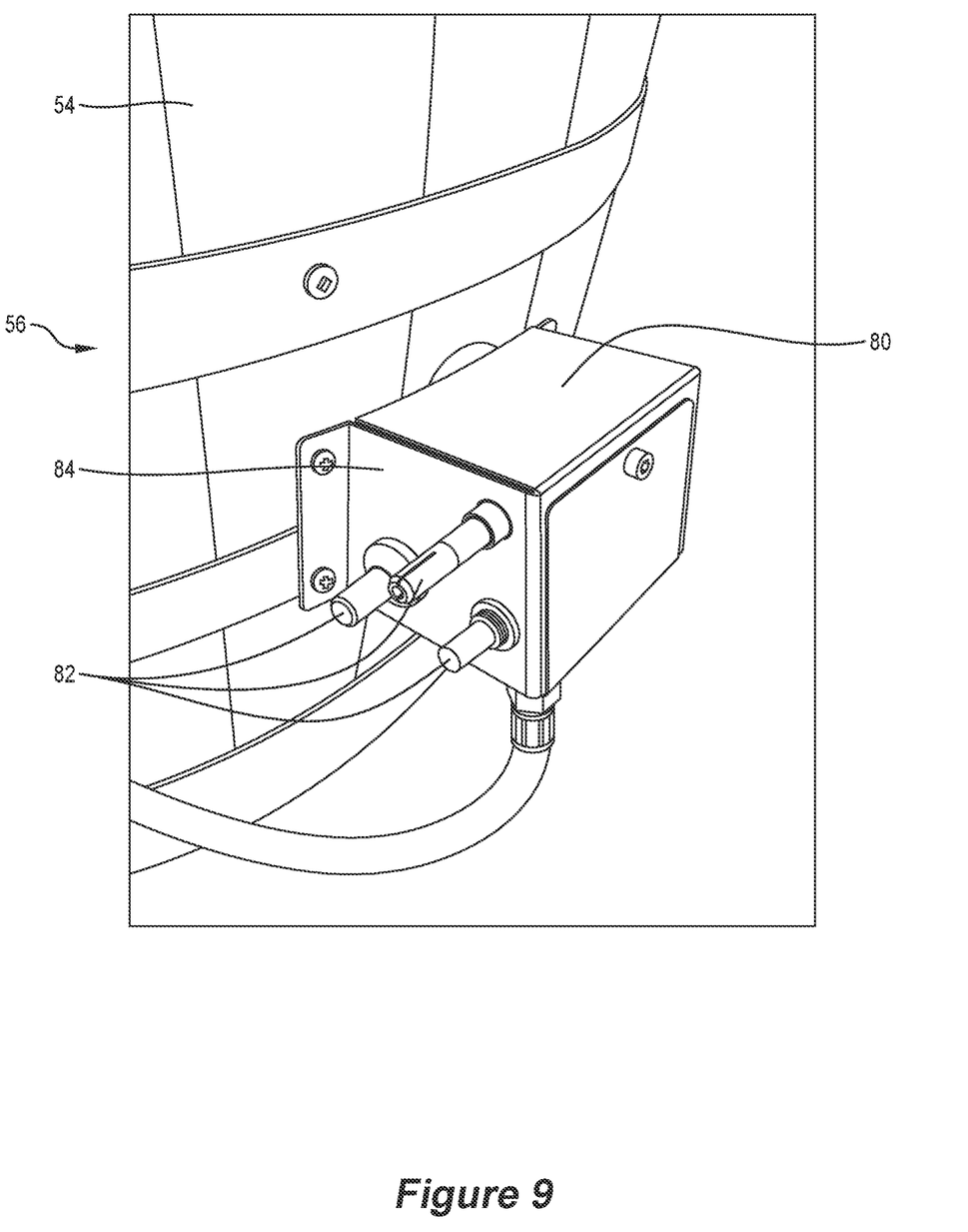
FIG. 9 shows a housing attached to a container for mounting gas parts.

Referring particularly to FIG. 9, a housing 80 mounted on the container 56 and located external to the container 56 is provided for securing gas parts 82 such as a gas valve, a flame failure valve and an electric start switch. The gas parts 82 are for monitoring and regulating the burner flame. The housing 80 has a removable inspection plate to service the gas parts 82. The gas parts 82 are mounted on a side 84 of the housing which is adjacent to the container 56, thereby protecting the outside portions of the gas parts 82 from impact by a body moving towards the container 56, which is more likely than impact by a body moving tangential to the container 56.

A u-shaped hook is mounted on a side wall 64 of the container 56, external to the container 56. The gas regulator 88 for connecting a gas cylinder to the burner 58 can be hung on the hook by the flexible pipe 90 attached to the regulator 88. The regulator 88 is therefore safely stored when moving the cooking apparatus 50.

A thermostatic control valve can control the temperature inside the container 56. The thermostatic control valve includes a thermocouple to detect the temperature inside the container 56, and a gas supply regulator to control the amount of gas being supplied to the burner 58 to bring the temperature inside the container to a set temperature.

Rack Assembly

Referring particularly to FIGS. 4 to 6D, A rack assembly 92 includes four legs 94 mounted inside the container 56 to hold at least one cooking platform 96. The legs 94 are equidistantly spaced from each other. In this embodiment, the cooking platform consists of two grills. The number of grill could be increased, for example the cooking platform could have three or four grills. The legs 94 are provided with cooking platform rests 98, which, in this example are formed from the legs 94 by bending the legs 94 in an appropriate manner. The cooking platform 96 includes a protrusion 100 to enable the cooking platform 96 to sit on the rests 98. In this embodiment, each leg 94 includes a rest 98, and each cooking platform 96 includes a corresponding protrusion 100.

One end of each of the legs 94 is received in a corresponding slot 102 located on the first shield member 62 to position the legs 102. The legs 94 may rest on the first shield member 62 such that the entire rack assembly 92 is removable from the container 56.

The cooking platform 96 includes a side edge 104 to restrict food from falling off the cooking platform 96. The side edge 104 is a 25 mm wide stainless steel band.

The rack assembly 92 is removed from the container 56 by relaxing a pre-tensioned biasing means such as a spring.

Ventilation

Figure 6A:
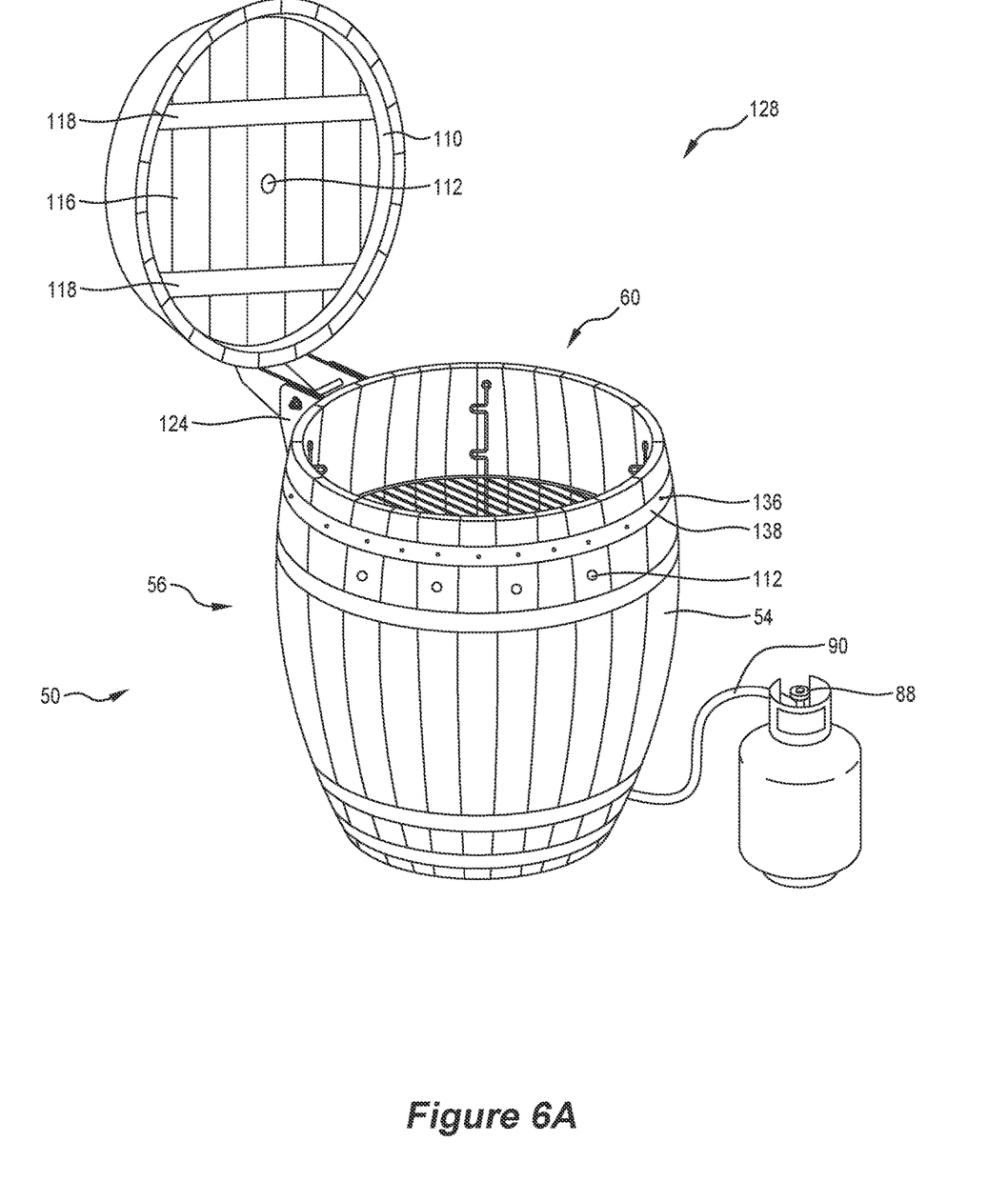
FIGS. 6A, 6B, 6C and 6D show various views of a cooking apparatus according to another embodiment of the present invention in an open position
Figure 6B:
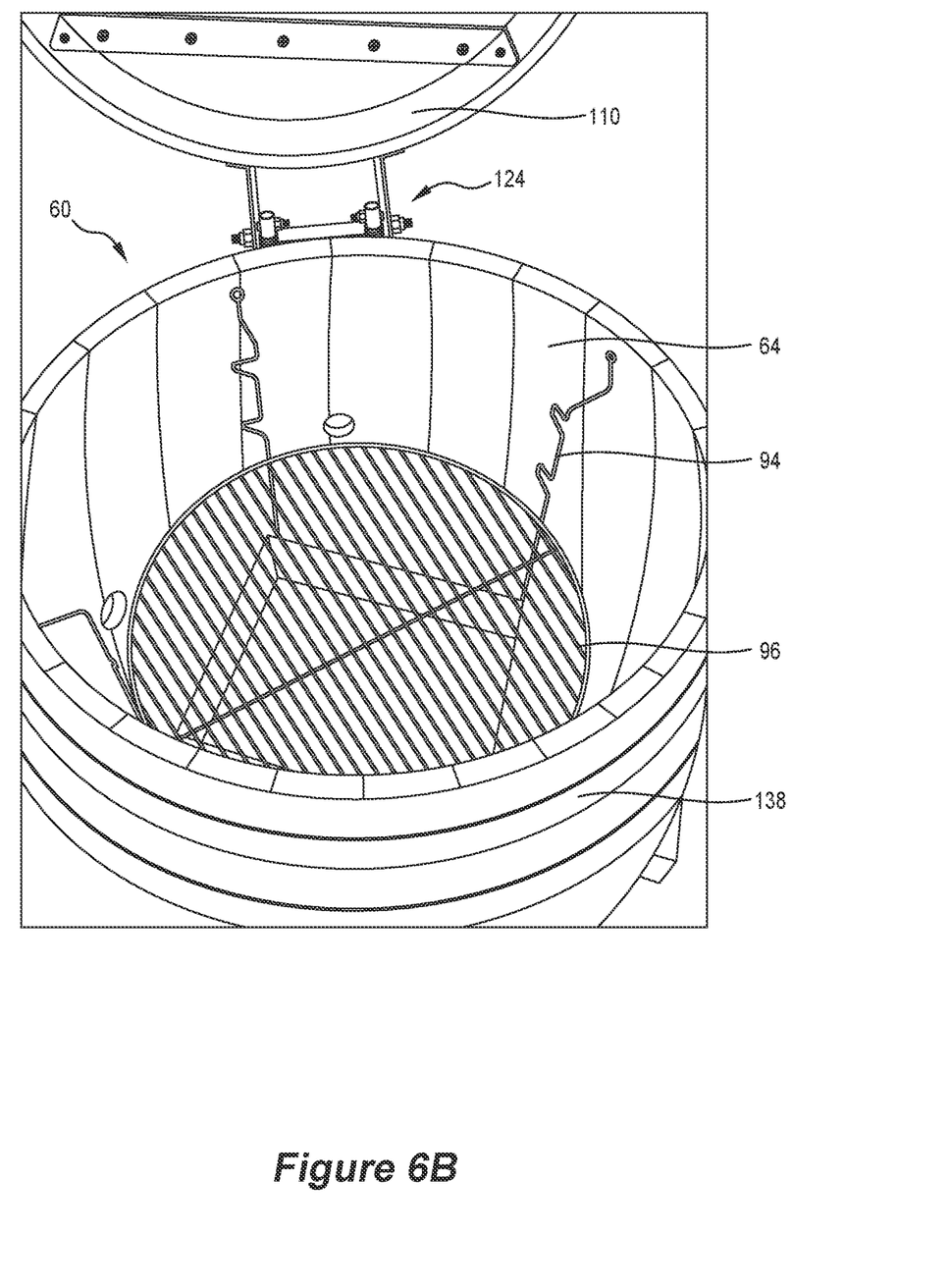
Figure 6C:
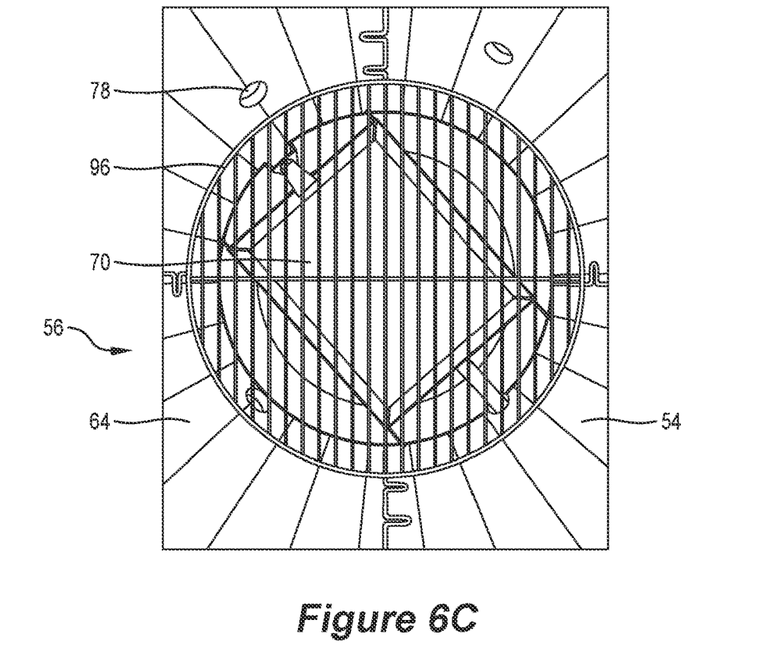
Figure 6D:
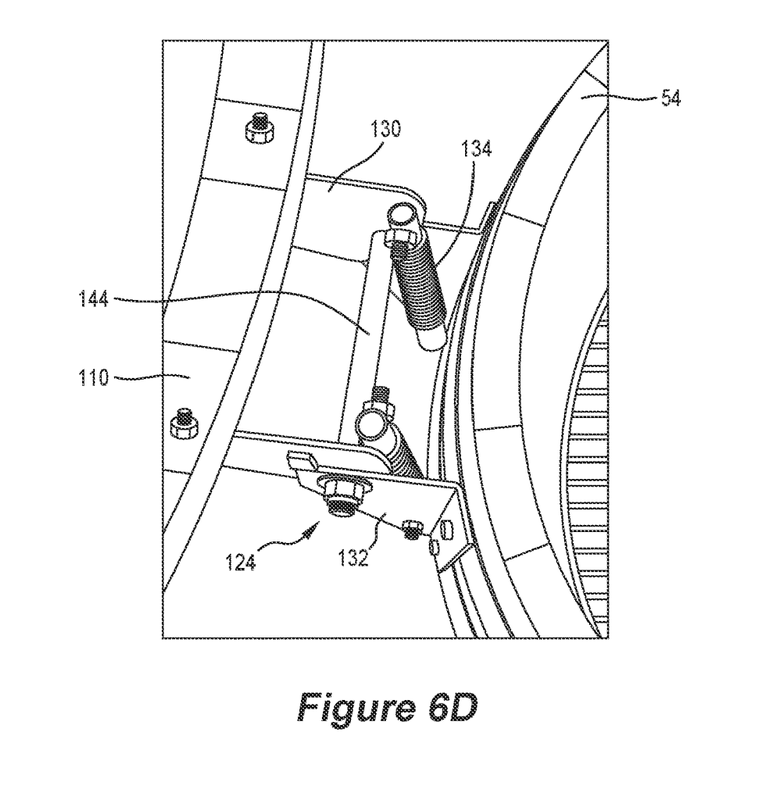
Figure 7:
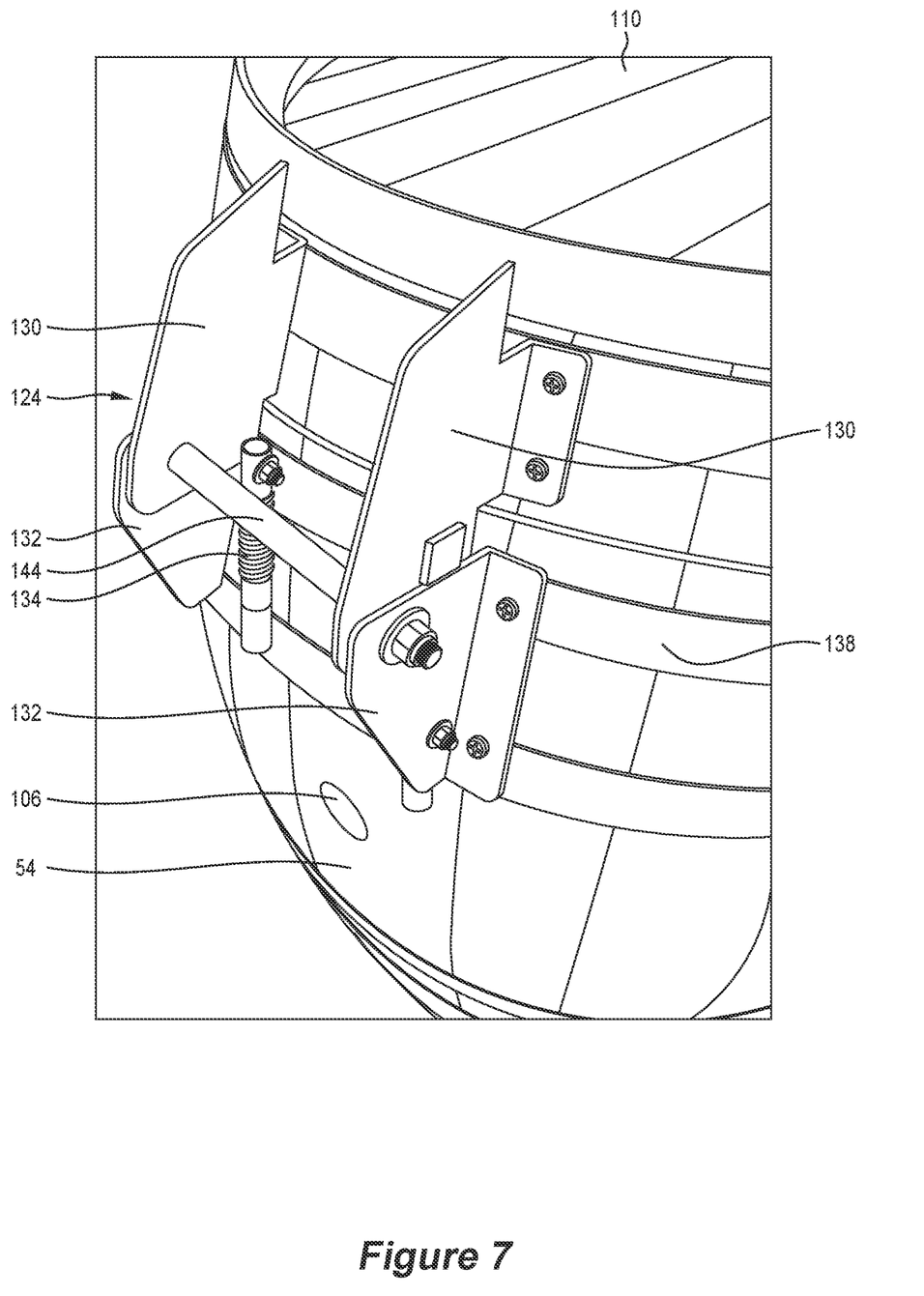
FIG. 7 shows a view of the cooking apparatus of FIG. 6 in a closed position.
Figure 8:
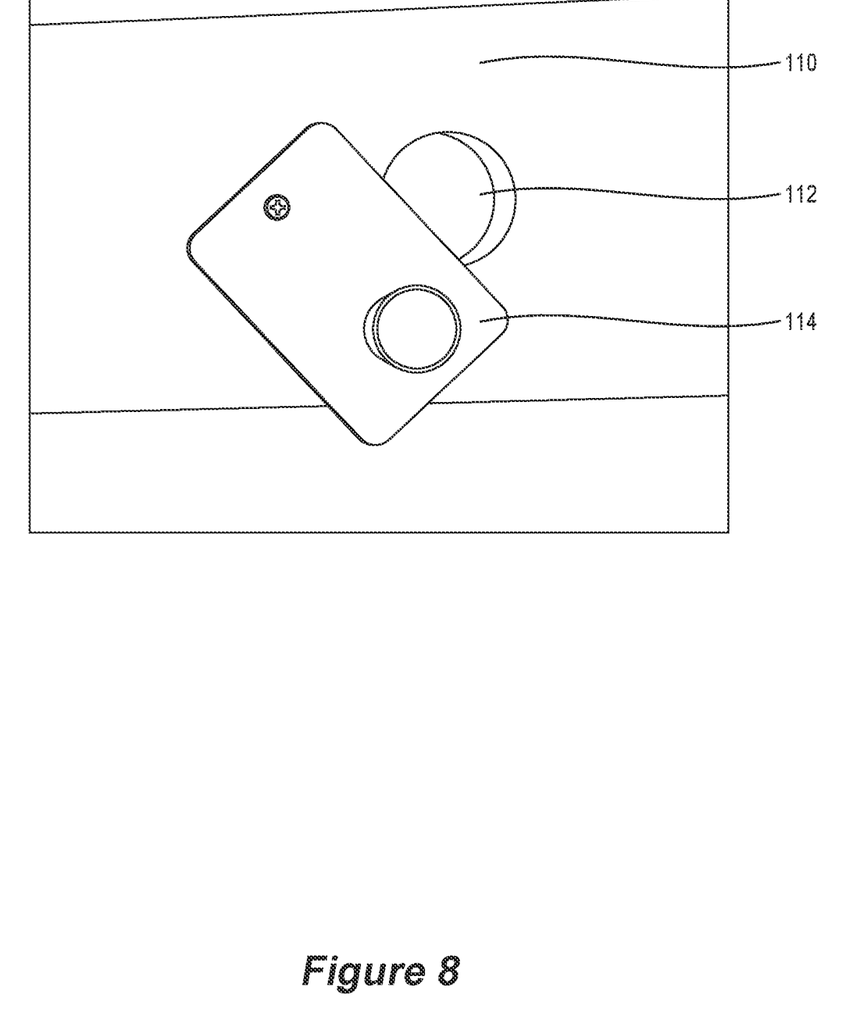
FIG. 8 shows an enlarged view of a vent aperture on a lid member and a cover for the vent aperture.

Referring particularly to FIGS. 6A and 8, a plurality of second apertures 108 are provided on a side 64 of the container 56, located above the heating means 58. The second apertures 108 vent heat and smoke from the container 56. In this embodiment, there are sixteen second apertures 108 spaced from each other. The second apertures 108 are frustoconical in shape having a 20 mm diameter at the outside of the container 56 and tapering to a 12 mm diameter inside the container 56. This shape is useful for removing pressurised gasses from inside the container 56.

The ventilation assists in removing excessive carbon monoxide, created due to burning, from the container 56.

It has been found that the cooking apparatus 50 is prone to charring at the top edge of the container 56 and edge of the lid member 110. The second apertures 108 are located just under the top opening 60 of the container 56 to remove excessive heat from this location, thereby reducing charring of the cooking apparatus 50.

Lid Member

Referring particularly to FIGS. 1 to 8, a lid member 110 is provided to cover the opening 60 of the container 56.

A vent aperture 112 is provided to vent excessive heat and smoke from the cooking apparatus 50. In this embodiment, the vent aperture 112 is located at the center of the lid member 110. Also provided is an openable vent cover 114 to selectively open or close the vent aperture 110. The openable vent cover 114 is a steel plate having a wooden a handle which is rotatably attached to the lid member 110. The vent aperture 112 also enables inspection of the food being cooked without opening the container 56.

The lid member 110 is a wine barrel lid including a plurality of wooden members (staves) 116 held together. Two strut members 118 securely attached the plurality of wooden members 116 by means of fasteners. Therefore, even if the wooden members 116 become dry and shrink in size, they are still held in place by the strut members 118.

A handle 120 is attached to the lid member 110 to assist opening the container 56. The handle includes a wooden holding member 122 on a metal bracket, the metal bracket attached to the lid member 110. The handle 120 is located external to the cooking apparatus 50. The wooden holding member 122, because of its low thermal conductivity, does not over heat. Therefore, the container 56 can be opened by holding the wooded holding member 122 either with bare hands or using kitchen towel or over gloves.

The handle is located opposite to a hinge member 124 attaching the lid member 110 to the container 56.

A hinge member 124 pivotably attached the lid member 110 to the container 56. The lid member can be moved between a closed position 126 in which the lid member covers the opening 60 of the container 56, and an open position 128 in which the lid member is moved away from the opening 56.

The hinge member includes a first element 130 attached to the lid member 110, a second element 132 attached to the container 56 and a bar 144 connecting the first and the second elements 130, 132. The first and second elements rotate relative to each other at the bar 144. The first element 130 includes two steel plates attached to the lid member 110 and spaced from each other. The second element 132 includes two steel plates attached to the container 56 and spaced from each other. The bar 144 is used as a handle to move the cooking apparatus 50. The bar 144 may be covered with a wooden holding member which has low thermal conductivity, thereby being cooler to hold than the metal bar 144 (when the cooking apparatus is being used).

Two biasing means 134, such as springs, are provided between the first element 130 and the second element 132 to assist opening and closing of container 56. One biasing means 134 is located at each set of steel plates of the first and second elements 130, 132.

When moving the lid member 110 towards the open position, the biasing means 134 relaxes such that the lid member 110 is pulled by the biasing means 134 towards the open position 128. Therefore opening of the container 56 is assisted by the biasing means 134 such that the weight of the container need not be lifted by the user.

On the other hand, the biasing means 134 tenses when moving the lid member 110 towards the closed position to prevent the lid member 110 from free falling on the container opening 60. The arrangement protects pinching user's fingers between the lid member 110 and the container 56.

Additionally, a stopping means is provided to restrict movement of the lid member 110 to a pre-determined open position 128. The pre-determined open position is between where the lid member 110 is vertical above the container 56 and horizontal away from the opening 60 of the container 56. In this embodiment, the pre-determined open position is slightly greater than 90 degrees.

Wheels

Referring particularly to FIGS. 4 and 5, a plurality of wheels (140, 142) are attached at the bottom of the container 56 to assist moving the cooking apparatus 50. Two first wheels 140 attached at a first end corresponding to the location of the hinge member 124. Two second wheels 142 are attached at an end opposite to the first end. The wheels (140, 142) enable smooth movement of the cooking apparatus 50 on a substantially flat surface.

Either the first wheels 140 or the second wheels 142 are rotating castor wheels. The corresponding wheels (140 or 142) are fixed castor wheels.

The wheels (140, 142) are low profile castor wheels, so that the cooking apparatus 50 appears to be standing on ground i.e. not on wheel (140, 142).

The claims defining the invention are as follows:

1. A cooking apparatus including a container formed by a base member and a plurality of side members constructed of wood are held together to form a side wall of the container, a heating means comprising a gas burner inside the container for generating heat in the container, the container having at least one cooking platform, an opening for placing food to be cooked on the at least one cooking platform in the container, and the container being adapted to store liquid above the base member to hydrate the side members and to receive waste matter from cooking the food, the side of the container including at least one first aperture located below the gas burner for feeding air to the gas burner and which defines a maximum liquid level for the liquid stored in the container allowing the liquid and any waste matter in the liquid to be drained from the container by tilting the container, wherein the gas burner is positioned above said maximum liquid level, and the cooking apparatus further including a first shield member inside the container, a second shield member and a third shield member, the first shield member being complementary to the shape of the side wall of the container, the first shield member being spaced and separate from the side wall of the container to provide an air gap therebetween, the first shield member surrounding the gas burner to restrict flame from the gas burner from contacting the side wall of the container and to protect a flame of the gas burner from wind entering through the at least one first drain aperture, the second shield member being spaced from the base member to provide an air gap therebetween and separate from and surrounded by the first shield member and disposed below the gas burner to restrict the flame from the gas burner from directly contacting the base member, and the third shield member being comprising a receptacle which is surrounded by the first shield member and disposed above the gas burner and below the at least one cooking platform, the receptacle being configured to catch and filter solid and liquid debris to restrict debris from falling on the gas burner, the receptacle having
   (i) at least one aperture at its lower end to release liquid debris from the receptacle to the liquid stored in the bottom of the container, and
   (ii) side panels spaced from the first shield member to provide an air gap therebetween.

2. A cooking apparatus according to claim 1, wherein the side members are constructed from wood.

3. A cooking apparatus according to claim 1, wherein the gas burner is an inline burner.

4. A cooking apparatus according to claim 1, including at least one leg attaching the first shield member to the container.

5. A cooking apparatus according to claim 1, wherein the third shield member gathers solid debris of a certain size in the receptacle.

6. A cooking apparatus according to claim 5, including a scoop having an elongate handle for delivering smoke chips to the receptacle through an aperture on a side of the container above the receptacle.

7. A cooking apparatus according to claim 1, including a housing outside the container for securely mounting gas parts.

8. A cooking apparatus according to claim 7, wherein the gas parts are mounted on a side of the housing adjacent the container to protect the gas parts during transport.

9. A cooking apparatus according to claim 1, including a rack assembly having at least two legs mountable in the container and at least one cooking platform locatable on the at least two legs.

10. A cooking apparatus according to claim 9, wherein each leg includes a rest to receive a respective protrusion attached to the at least one cooking platform.

11. A cooking apparatus according to claim 9, wherein each leg is received in a slot in a frame attached to the container.

12. A cooking apparatus according to claim 11, wherein the frame is the first shield member inside the container, spaced from a side wall of the container and surrounding the burner to restrict flame from the gas burner from directly contacting the side wall.

13. A cooking apparatus according to claim 9, wherein at least one cooking platform includes a side edge to restrict food from falling off.

14. A cooking apparatus according to claim 9, wherein the rack assembly is removed from the container by relaxing a pre-tensioned biasing means.

15. A cooking apparatus according to claim 1, including a thermostatic control valve to control the temperature inside the container.

16. A cooking apparatus according to claim 1, including a plurality of first apertures spaced from each other.

17. A cooking apparatus according to claim 1, including a plurality of second apertures on the side of the container, the second apertures located above the heating means to vent heat and smoke from the container.

18. A cooking apparatus according to claim 17, wherein the second apertures are tapered from the outside of the container towards the inside of the container.

19. A cooking apparatus according to claim 1, including a lid member to cover the opening.

20. A cooking apparatus according to claim 19, wherein the lid member has a vent aperture to vent heat and smoke from the cooking apparatus.

21. A cooking apparatus according to claim 20, including an openable vent cover to selectively open and close or partially open the vent aperture.

22. A cooking apparatus according to claim 21, wherein the openable vent cover is a plate rotatably attached to the lid member.

23. A cooking apparatus according to claim 19, wherein the lid member includes a plurality of wooden members held together, and at least one strut member securely attached to the plurality of wooden members by fasteners.

24. A cooking apparatus according to claim 19, including a handle attached to the lid member, the handle external to the cooking apparatus, to assist opening the container, wherein the handle includes a wooden holding member.

25. A cooking apparatus according to claim 19, including a hinge member, the hinge member pivotably attaches the lid member to the container such that the lid member can be moved between a closed position in which the lid member covers the opening, and an open position in which the lid member is moved away from the opening.

26. A cooking apparatus according to claim 25, wherein the hinge member includes a first element attached to the lid member, a second element attached to the container and a bar connecting the first and second elements such that first element rotates relative to the second element at the bar.

27. A cooking apparatus according to claim 26, wherein the bar is used as a handle to move the cooking apparatus.

28. A cooking apparatus according to claim 25, wherein the hinge member includes a biasing means to assist opening and closing the container.

29. A cooking apparatus according to claim 28, wherein the biasing means relaxes when moving the lid member towards the open position such that the lid member is pulled by the biasing means towards the open position.

30. A cooking apparatus according to claim 28, wherein the biasing means tenses when moving the lid member towards the closed position in order to prevent the free falling of the lid member on the opening of the container.

31. A cooking apparatus according to claim 25, wherein the hinge member includes a stopping means to restrict movement of the lid member at a predetermined open position.

32. A cooking apparatus according to claim 1, including a plurality of fasteners attaching a holding member to the plurality of side members in order to secure the side members.

33. A cooking apparatus according to claim 32, wherein at least one fastener attaches the holding member to each side member.

34. A cooking apparatus according to claim 1, including a plurality of wheels attached at bottom of the container to assist moving the cooking apparatus.

35. A cooking apparatus according to claim 34, wherein a first wheel is attached at a first end, the first end corresponds to location of a hinge member attaching the container to a lid member, and a second wheel is attached at a second end, the second end opposite the first end.

36. A cooking apparatus according to claim 35, wherein one of the first and second wheels is a rotatable castor wheel and the other is a fixed castor wheel.

37. A cooking apparatus according to claim 1, including a tray located below the heating means configured for storing liquid.

38. A cooking apparatus according to claim 1, wherein the at least one cooking platform comprises at least two grills.

* * * * *